Figure 1:
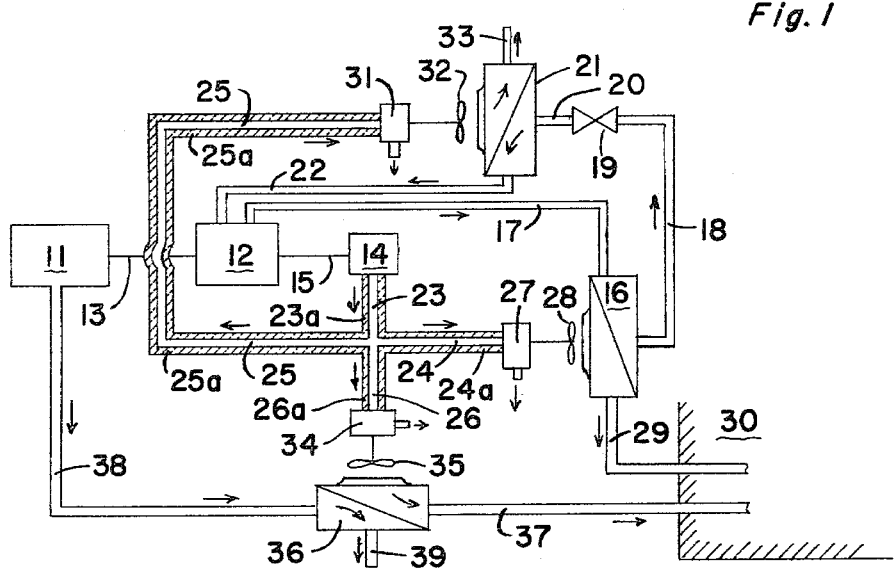

United States Patent [19]

Braun

[11] 4,292,814
[45] Oct. 6, 1981

[54] HEAT PUMP

[76] Inventor: Anton Braun, 6421 Warren Ave., Minneapolis, Minn. 55435

[21] Appl. No.: 48,527

[22] Filed: Jun. 13, 1979

[51] Int. Cl.³ .............................................. B60H 3/04
[52] U.S. Cl. ........................................ 62/243; 62/429; 237/12.3 A; 237/238.6; 237/323.1; 237/238.7
[58] Field of Search ................ 62/243, 238 E, 323 R, 62/324 D, 429, 86, 7; 237/12.3 A

[56] References Cited
U.S. PATENT DOCUMENTS

| | | | |
|---|---|---|---|
| 2,341,549 | 2/1944 | Helmick | 237/12.3 A |
| 2,782,613 | 2/1957 | Addie | 62/323 R |
| 2,937,513 | 5/1960 | McNinch, Jr. et al. | 62/323 R |

OTHER PUBLICATIONS

Heat Pump Technology, Cons/2127-d Draft, ERDA Report of Jul. 1977, pp. 98-100.

*Primary Examiner*—Ronald C. Capossela

[57] ABSTRACT

A heat pump, driven by a free piston engine, wherein a refrigeration type of heat transfer unit is used and no externally energized electric motors are required but could be used, if desired. The engine is larger in horsepower than would be required for driving the compressor of the unit only, as it also provides power for driving one or more gas driven or other motors for forcing air through heat exchangers. This arrangement requires substantially less total energy than a unit requiring external electrical energy for operating portions of the heat pumps in that the extra heat in the exhaust from the larger horsepower engine is utilized in a heat exchanger to supply extra heat to the space being heated by the heat pump's primary heat supplier.

5 Claims, 2 Drawing Figures

HEAT PUMP

This invention is directed to a heat pump such as is used to heat or cool a building. While such heat pumps have been known for a number of years, they have been lacking in efficiency. This is, to a large extent, due to the use of electric motors which (in turn) use electricity independently generated by high energy using equipment.

Figure 2:
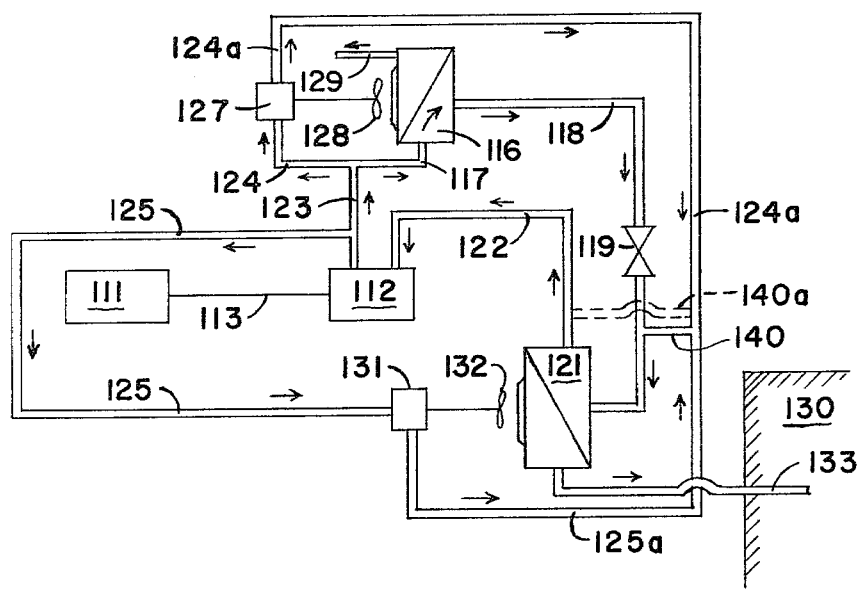

The invention described herein has a higher coefficient of performance (COP) than prior art heat pumps and is not subject to shutdown should outside electric power be cut off. Two systems are disclosed in the drawing wherein:

FIG. 1 is a schematic view of a heat pump driven by a heat engine and having a main compressor and an auxiliary compressor for driving fans; and FIG. 2 is a similar view of a heat pump wherein a single compressor is used.

Referring to FIG. 1, a heat engine 11, such as a free piston engine, drives a "freon" or other suitable refrigerant type of gas compressor 12 (an energy absorbing device), through a drive shaft 13.

Compressor 12 delivers compressed refrigerant to a condenser 16, through conduit 17, where it is condensed, and then flows through conduit 18 to an expansion valve 19. From valve 19, the refrigerant passes through short conduit 20 into the expansion chamber of evaporator 21, from which the refrigerant returns to compressor 12 through conduit 22.

An auxiliary compressor 14 supplies air (gas) through a main conduit 23 to branch conduits 24, 25, and 26. All four of these conduits are preferably covered with good insulation 23a, 24a, 25a, and 26a, respectively, to prevent heat loss from the conduits and thus maintain efficiency and prevent icing of the exhaust portions of motors 27, 31 and 34.

An air (gas) driven motor 27 drives a fan 28 which forces air through condenser 16, where it becomes heated, and through conduit 29 into the space to be heated, such as a building 30. While fans are illustrated as the means for forcing air thru the heat exchangers, pumps could be used to force a liquid through the exchanger.

An air (gas) driven motor 31, drives a fan 32 which forces outside air through evaporator 21, where it gives up heat before flowing to the atmosphere through conduit 33.

An air driven motor 34 drives a fan 35 which forces air, through a heat exchanger 36, where it picks up heat, and through conduit 37 into building 30. The air is heated in 36 by exhaust gases flowing therethrough from engine 11, through conduit 38, and to the atmosphere through conduit 39.

The modification of FIG. 2 operates in a manner similar to that of FIG. 1, but in a cooling arrangement, except that instead of having an auxiliary compressor, part of the gas from the only compressor would be used to drive fans. In this arrangement, an engine 111 drives a compressor 112 through shaft 113 and refrigerant is compressed and supplied to a condenser 116 through conduits 123 and 117. The cooled refrigerant then flows through conduit 118 and an expansion valve 119. From 119, the refrigerant flows through an evaporator 121 and back through conduit 122 to compressor 112.

A part of the compressed refrigerant from the compressor flows through a branch conduit 124, through a motor 127 and, through conduits 124a and 140 to the evaporator or, alternatively, through 124a and 140a to the compressor. Motor 127 drives a fan 128 which, in turn, force air through the condenser where it picks up heat before flowing through conduit 129 to the atmosphere. Another part of the compressed refrigerant flows through conduit 125, through motor 131 and through conduit 125a to conduit 124a. Motor 131 drives a fan 132 which, in turn forces air through evaporator 121, to cool the air, before flowing through conduit 133 into a building 130.

The operation of the above modifications of the invention is deemed to be apparent from the detailed description thereof, the components of the apparatus being conventional although the arrangement and cooperation therebetween is novel. This arrangement, using a free piston engine provides a heat pump that is simpler, less costly and substantially more efficient than know commercial heat pumps.

I claim:

1. A heat pump having internal combustion engine driven compressor means, a condenser, an evaporator and closed fluid flow circuit means between said compressor means, condenser and evaporator, characterized in that said condenser has fluid actuatable fan means arranged to force air through said condenser, said evaporator has fluid actuatable fan means arranged to force air through said evaporator and each of said fluid actuatable fan means has a fluid flow connection with said compressor means.

2. In a heat pump as defined in claim 1, wherein said fluid flow connections are insulated against heat loss to maintain a relatively high fluid temperature at said fluid actuatable fan means.

3. In a heat pump as defined in claim 1, in combination with a heat exchanger arranged to have exhaust gases from said engine pass there through, fluid actuatable fan means arranged to force air through said heat exchanger, and a fluid flow connection between said heat exchanger's fluid actuatable fan means and said compressor means.

4. In a heat pump as defined in claim 1, wherein said compressor means includes a main compressor for supplying fluid only to said condenser and an auxiliary compressor for supplying fluid only to said fan means.

5. In a heat pump as defined in claim 1, wherein said compressor means consists of a single compressor unit and said fluid flow connections extend from said single compressor unit.

* * * * *